United States Patent [19]

Wilson, Sr.

[11] 4,118,768
[45] Oct. 3, 1978

[54] DEMAND CONTROLLED PREREGULATING RECTIFIER CIRCUIT FOR POWER SUPPLIES

[75] Inventor: Denney L. Wilson, Sr., Georgetown, Del.

[73] Assignee: NCR Corporation, Dayton, Ohio

[21] Appl. No.: 779,654

[22] Filed: Mar. 21, 1977

[51] Int. Cl.² ............................................ H02M 7/155
[52] U.S. Cl. .................... 363/85; 323/22 SC; 363/128; 307/252 N
[58] Field of Search .................... 323/22 SC, 22 Z, 38; 363/52–54, 80, 81, 84, 85, 86, 89, 128; 307/252 N

[56] References Cited

U.S. PATENT DOCUMENTS

| | | | |
|---|---|---|---|
| 3,230,443 | 1/1966 | Hallidy | 323/22 SC X |
| 3,235,787 | 2/1966 | Gordon et al. | 323/22 Z |
| 3,311,787 | 3/1967 | Gunderman | 361/101 |
| 3,418,554 | 12/1968 | Legatti | 363/84 X |
| 3,663,943 | 5/1972 | Nakajima et al. | 363/85 |
| 3,711,763 | 1/1973 | Peterson | 323/38 X |
| 3,786,339 | 1/1974 | Milovancevic | 323/38 X |
| 3,819,986 | 6/1974 | Fukuoka | 361/56 |

Primary Examiner—William M. Shoop
Attorney, Agent, or Firm—J. T. Cavender; Albert L. Sessler, Jr.; Elmer Wargo

[57] ABSTRACT

A rectifier and preregulator circuit using a first silicon controlled rectifier (SCR) to rectify AC voltage and apply the rectified voltage across a capacitor which is used as a storage device. The circuit also includes a transistor, zener diode and a second (SCR) in a switching arrangement for turning on the first SCR and for turning off the transistor and zener diode when a minimum voltage is reached so as to minimize dissipation of electrical power in the circuit. A second zener diode and a third SCR are used in a switching arrangement to control the maximum rectified voltage from the circuit.

16 Claims, 1 Drawing Figure

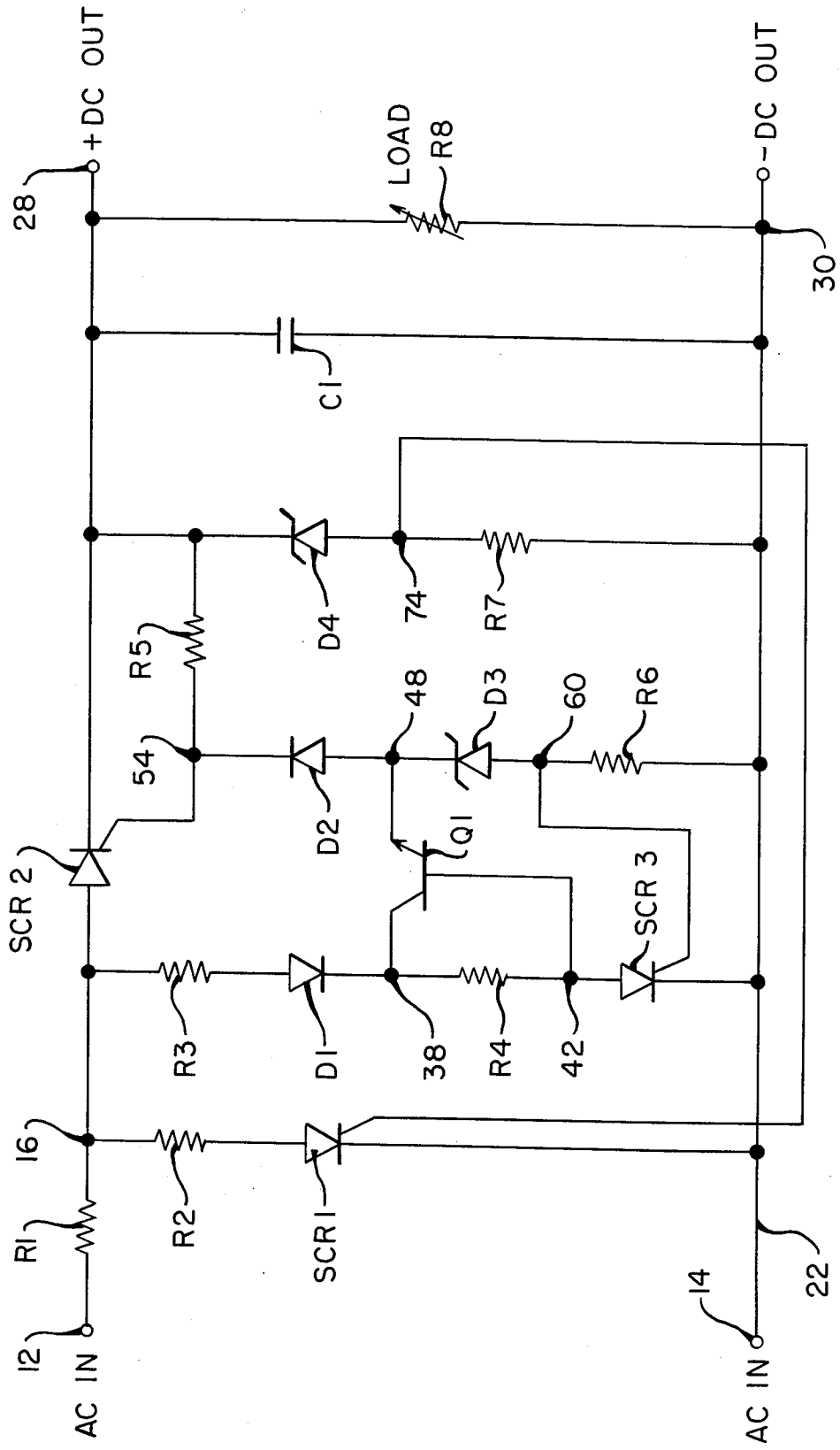

DEMAND CONTROLLED PREREGULATING RECTIFIER CIRCUIT FOR POWER SUPPLIES

BACKGROUND OF THE INVENTION

This invention relates to the field of constantvoltage, power supply circuits and particularly, to power supply circuits using silicon controlled rectifiers (SCRs).

In general, power supply systems designed for use in point of sale terminals, like electronic cash registers for example, typically used a traditional half or full-wave bridge circuit driving a storage/regulator type system. While this system has worked well and is still widely used, it has severe disadvantages in terms of cost, heat dissipation problems, size of components required, sensitivity to line voltage variation, and sensitivity to and efficiency as a result of load current variations.

The circuit of this invention includes a capacitor which is used as an energy storage device. Special switching means are included within the circuit to minimize the power consumption within the circuit, to minimize heat dissipation, and consequently reduce the cost and size of the heat sinks required.

In general, the circuit of this invention uses a silicon controlled rectifier (SCR) as the rectifier and controls it in such a way as to allow certain voltage conditions to be maintained across a capacitor which is used as an energy storage device. This capacitor is rapidly charged to some upper voltage limit $V_1$ and is then allowed to discharge linearly (by a load) to a lower limit $V_2$. It is then charged again to $V_1$ and the cycle is repeated. The values of $V_1$ and the capacitor are chosen so as to require recharging only at large intervals (over a period of several input A.C. cycles). Current is drawn through the SCR only during the charging from $V_2$ to $V_1$ (less than $\frac{1}{2}$ cycle A.C.). Special switching means are included within the circuit to minimize power dissipation therein. The output of the capacitor may then be fed to a battery charging circuit, or to a subsequent terminal voltage regulator, or it may be used directly as a power supply source.

Some representative prior art power supply circuits are shown in the following U.S. Pat. Nos.: 3,781,632; 3,939,394; 3,959,716; 3,969,665; 3,987,354; and 3,987,356.

Of these patents, U.S. Pat. No. 3,939,394 discloses a power supply circuit using a silicon controlled rectifier for charging a capacitor; however, this circuit does not show the special switching means included in the circuit of the present invention so as to minimize power consumption therein.

SUMMARY OF THE INVENTION

This invention relates to a rectification and regulation circuit comprising first and second input terminals for connection to a source of AC potential, and first and second DC output terminals, with the second input terminal being connected to the second output terminal. The circuit also comprises an electrical storage means operatively connected or effectively coupled between the first and second DC output terminals, and a gated rectifier means operatively connected or effectively coupled between the first input and the first DC output terminals, with the rectifier means having a gate means associated therewith. A first switching means or control means having an input operatively connected to the first input terminal and having an output operatively connected to the gate means is used for turning on said gated rectifier means to supply DC voltage to said output terminals. A second switching means or control means including a switch and a voltage detecting means, is also included, with the switch being operatively connected between the input of the first switching means and the second input terminal, the voltage detecting means being operatively connected to the output of the first switching means so as to enable the second switching means to deactivate the first switching means and the voltage detecting means when a predetermined voltage level is reached at said output of the first switching means so as to minimize the power dissipation in the first switching means and the voltage detecting means. A third switching means is also used to deactivate the gated rectifier means when a maximum desired voltage on the electrical storage means is reached.

Other advantages of this invention will be more readily understood in connection with the following specification, claims and drawing.

DESCRIPTION OF THE DRAWING

The drawing is a schematic diagram of the circuit of this invention.

DETAILED DESCRIPTION OF THE INVENTION

With reference to the drawing, the circuit constructed in accordance with a preferred embodiment of the present invention includes first and second input terminals 12 and 14 respectively, for connection to a source of AC potential. Terminal 14 may be connected to a system ground for operator safety. Resistors R1 and R2 are series connected to form a voltage divider network, with resistor R1 being connected to the input terminal 12, and with the junction between resistors R1 and R2 forming a junction point 16. The remaining end of resistor R2 is connected to the anode electrode of a thyristor such as a silicon controlled rectifier (hereinafter called SCR) which rectifier is designated as SCR1. The cathode electrode of SCR1 is connected to a common conductor 22 which has one end connected to the input terminal 14.

Rectification of the input AC voltage is effected by a gated rectifier means such as a thyristor or silicon controlled rectifier designated as SCR2. The anode electrode of SCR2 is connected to junction point 16 and the cathode electrode thereof is connected to a first output terminal 28, with first output terminal 28 and a second output terminal 30 providing the DC output from the circuit. Common conductor 22 electrically connects the second input terminal 14 and the second output terminal 30. In the embodiment shown, output terminals 28 and 30 are respectively positive and negative with respect to each other.

A first switching means is utilized to turn on SCR2 to rectify the input AC voltage and includes resistor R3, diode D1, resistor R4, a semiconductor switch such as an NPN transistor Q1, and diode D2. Resistor R3 has one end thereof connected to input terminal 12 via resistor R1, and the remaining end thereof connected to the anode electrode of diode D1. The cathode electrode of diode D1 is connected to the collector electrode of transistor Q1 at junction point 38. Resistor R4 is series connected between junction point 38 and the base electrode of transistor Q1 at a junction point 42. The emitter electrode of transistor Q1 is connected to the anode electrode of diode D2 and the cathode electrode of zener diode D3 at junction point 48. The cathode electrode of diode D2 is connected to the gate electrode of SCR2 at junction point 54.

A second switching means consisting of zener diode D3, resistor R6 and silicon controlled rectifier SCR3 is used to turn off or deactivate the previously described first switching means. The cathode electrode of the diode D3 is connected to the junction point 48, and the anode electrode thereof is series connected with the resistor R6 at junction point 60, with the remaining end of resistor R6 being connected to common conductor 22. The gate electrode of SCR3 is connected to junction point 60, the anode electrode thereof is connected to junction point 42, and the cathode electrode thereof is connected to common conductor 22.

A third switching means is provided for limiting the maximum voltage at output terminals 28 and 30, and includes zener diode D4, resistor R7, and silicon controlled rectifier SCR1. The cathode electrode of diode D4 is connected to output terminal 28, the anode electrode thereof is series connected with the resistor R7 at junction point 74, and the remaining end of resistor R7 is connected to common conductor 22. The gate electrode of SCR1 is connected to junction point 74.

Capacitor C1 is connected across output terminals 28 and 30, and resistor R5 is connected between the gate electrode of SCR2 and output terminal 28.

In describing the mode of operation of the just described circuit, it is first assumed that the voltage across capacitor C1 is zero and that a positive half-cycle of the input AC voltage appears at input terminals 12 and 14 so as to apply a positive voltage to the anode electrode of SCR2. This same positive instantaneous voltage is also applied to the collector electrode of transistor Q1. Diode D1 functions as a steering diode, and resistor R4 is used to provide a forward bias for the base electrode of transistor Q1, which is thereby turned on by the positive input voltage. The voltage on the emitter electrode of transistor Q1 rises with the incoming voltage, causing this voltage to be applied to the gate electrode of SCR2 via diode D2 which also functions as a steering diode. As long as the voltage at the gate electrode of SCR2 is less than or equal to the voltage at the cathode electrode thereof, SCR2 will not turn on; however, as soon as the voltage on the gate electrode exceeds the voltage on the cathode electrode by the necessary firing voltage (usually about 0.6 volt), SCR2 will turn on, thereby supplying DC voltage to output terminals 28 and 30, and thereby charging capacitor C1. The voltage on the emitter electrode of transistor Q1 would normally continue to rise with the incoming positive AC voltage; however, zener diode D3 is in the circuit to limit the maximum voltage appearing on the emitter electrode of transistor Q1 to a predetermined value. This value is such as to establish the minimum voltage output while zener diode D4 (which functions as a voltage detecting means) is utilized to establish the maximum voltage output, as will be described in detail hereinafter.

When the predetermined voltage value on the emitter electrode of transistor Q1 is reached, zener diode D3 will conduct causing a voltage drop across resistor R6. When this occurs, a positive voltage will be applied (via junction 60) to the gate electrode of SCR3 causing it to conduct. When this occurs, the voltage on the anode electrode of SCR3 is reduced to approximately one half volt relative to the cathode electrode, thereby reducing the forward bias on the base electrode of transistor Q1, turning it off and eliminating any further current through the gate electrode of SCR2 for the half cycle of AC voltage under consideration. Because SCR2 has been turned on earlier, it will continue to conduct and charge capacitor, causing the voltage across capacitor C1 to continue to rise.

In the event the input AC voltage is low or if the value of capacitor C1 is extremely large, or if the value of resistor R1 is very large relative to the original design voltage, then the value of the voltage across capacitor C1 will not rise to the upper predetermined voltage level set by zener diode D4, and consequently, when the AC cycle begins to reverse itself (i.e., during the subsequent negative half cycle) SCR2 will become reverse biased and will be turned off. At this time, a load or utilization device (shown as a variable resistor R8) connected across output terminals 28 and 30 will continue to draw power only from capacitor C1. As long as the voltage across capacitor C1 is above the predetermined voltage set by zener diode D3, (which means that the voltage on cathode electrode of SCR2 is higher than the voltage on its gate electrode), SCR2 will not be turned on even during the next subsequent positive going cycle at input terminals 12 and 14.

If, however, the voltage across capacitor C1 drops below the predetermined voltage set by zener diode D3, the voltage at the gate electrode of SCR2 will be higher or more positive than the voltage on the cathode electrode thereof, and, consequently, SCR2 will be turned on again (via transistor Q1) to again charge capacitor C1.

If the voltage across capacitor C1 increases (due to the charge being delivered through SCR2 when it is conducting) and exceeds the predetermined maximum voltage output of the circuit (i.e., breakdown voltage of zener diode D4) a third switching means or "crowbar" circuit will be brought into effect. When the breakdown voltage of zener diode D4 is exceeded, a voltage is developed across resistor R7, thereby placing a positive voltage on the gate electrode of SCR1 which causes SCR1 to conduct, thereby reverse biasing SCR2 and turning it off.

Because transistor Q1 would already have been turned off (by the voltage at its emitter electrode rising above the breakdown voltage of zener diode D3 to cause SCR3 to conduct and thereby reducing the forward bias on the base of Q1 as previously explained), it cannot be turned on again until, at the earliest, the next positive AC half cycle of the input voltage. Because of the two actions just described, the voltage at output terminals 28 and 30 is maintained between two very closely defined maximum and minimum voltage levels, depending upon the tolerances of the zener diodes D4 and D3, respectively. These levels are substantially independent of the input AC voltage; however, the input AC voltage should not be so large in magnitude as to cause destruction of SCR1 or SCR2, or both, by excessively exceeding their respective breakdown voltages.

Resistors R1 and R2 serve to limit the current through SCR1, and resistor R1 serves to limit the current through SCR2. By properly choosing the values of resistors R1 and R2, and the breakdown voltages of SCR2 and SCR1, one can guarantee that there will be a minimum of power dissipation in the circuit due to the fact that power is drawn therefrom only when needed to charge capacitor C1, i.e., the outpiut is demand controlled. Minimum power dissipation is also guaranteed by turning off transistor Q1 as soon as the breakdown voltage of zener diode D3 is reached, as power is no longer dissipated in zener diode D3 or transistor Q1. Some power dissipation does occur in resistor R4; however, because its resistance value is high (typically on the order of from 10 to 20 K ohms) very low power dissipation results. Whenever the AC input voltage swings to a negative half cycle, transistor Q1 is turned off, and the only current flowing through resistor R4 is a normal, small, leakage current in the range of tenths of a microamp.

From what has been described, it is apparent that the voltage across capacitor C1 will be maintained between the upper voltage limit controlled by zener diode D4 and the lower voltage limit controlled by zener diode D3. The value of capacitor C1 will determine the frequency at which SCR2 and hence SCR1 turn off and on. The larger the value of capacitor C1 (as determined by the formula disclosed later herein), the lower the effective frequency for a given load will be, and consequently, the overall power dissipation in the circuit will be less. For an output voltage which fluctuates between 12–15 volts and with a typical average current drain of approximately one ampere, for example, the value of capacitor C1 may typically be between 10,000 to 30,000 mfd, with 20,000 mfd being the usual selection made. Because SCR2 is not necessarily turned on during each positive cycle of a 50 or 60 Hz frequency of the input voltage, the effective frequency of the output voltage is typically between 1 and 5 Hz.

The output of the circuit may be used directly to operate a device such as a print solenoid for a printer, or can be used as a preregulator with the output thereof being fed into any conventional regulating circuit. Naturally, by setting the breakdown voltage limits on zener diodes D4 and D3 to within one-half volt, for example, a more tightly controlled voltage supply is made available. An advantage here is that by knowing very accurately what the output voltage will be, any subsequent regulating circuit to which such output voltage is fed could be economically designed without the necessary constraints of high and low line voltage, high and low line frequencies and the usual overdesign that results in trying to protect the subsequent circuit from unpredictable or erratic input parameters.

In the design of the circuit constructed in accordance with a preferred embodiment of the present invention, it is important to insure that the capacitor C1 is large enough, valuewise, to handle the output load under the worst case conditions. For a minimum of power dissipation within the overall circuit, it is generally best to set the charging frequency on capacitor C1 between 1 and 5 Hz, although the charging frequency can be as high as the AC input frequency. However, it is best to keep the charging frequency low because as it approaches the AC input line frequency, the circuit becomes more wasteful of power because SCR1 would have to be used for every input AC cycle along with resistors R1 and R2.

The formula for determining the preferred value of capacitor C1 is given by the formula:

$$C1 = \frac{I_L}{f_c(V_M - V_m)}, \text{ wherein:}$$

$I_L$ equals the average load current;

$V_M$ equals the maximum acceptable voltage output from the circuit;

$V_m$ equals the minimum acceptable voltage output from the circuit; and $f_c$ equals the charging frequency across capacitor C1, generally about 1 to 5 Hz. In general, the larger the difference between $V_M$ and $V_m$, the better the circuit will perform.

As an illustration of the values of the various components used in the circuit, the following list of values is typical:

C1 = 20,000 mfd

R1 = 1 to 10 Ω; R1 limits the surge current through SCR2, ie.

R1 = $V_p/(2 I_s)$, wherein:

$V_p$ = peak AC input voltage; and $I_s$ = maximum surge current.

R2 = 200 Ω; R2 limits the anode voltage to SCR1 if $V_M$ is reached, ie.

$$R2 \leq \frac{V_M}{V_p - V_M} R1.$$

R3 = 200 Ω; R3 limits the current to the gate electrode of SCR2.

R4 = 10 K Ω; R4 provides the base bias to transistor Q1.

R5 = 1 K Ω; R5 couples the gate and cathode electrodes of SCR2.

R6 = 1 K Ω; R6 couples the gate and cathode electrodes of SCR3.

R7 = 1 K Ω; R7 couples the gate and cathode electrodes of SCR1.

SCR1 is typically a 2N6395 SCR; SCR1 is capable of withstanding $V_p$ and $I_s$.

SCR2 is typically a 2N6395 SCR; SCR2 is capable of withstanding $V_p + V_M$ and $I_s$ and $I_L$.

SCR3 is typically a 2N5064 or 2N6240 SCR; SCR3 is capable of withstanding $V_p$ and $V_p/(R3 + R4)$.

D1, D2 = blocking diodes like 1N914, etc.

D3 = Zener diode with a zener or breakdown voltage ($V_z$) equal to $V_m$, (typically 15 volts).

D4 = Zener diode with a zener or breakdown voltage $V_z$ equal to $V_M$ (typically 20 volts).

Q1 = a control transistor like MJE 2361 which can be any lower power NPN transistor able to have a BV > AC peak, wherein BV = 350 volts (typical).

What is claimed is:

1. A power supply circuit comprising:

input means for connection to a source of alternating potential;

output means;

rectifying means operatively connected between said input and output means, and having gating means associated therewith;

utilization means operatively connected to said output means;

first control means having an input operatively connected to said input means and having an output operatively connected to said gating means for controlling said rectifying means to allow said rectifying means to supply a rectified voltage to said output means;

second control means operatively connected to said first control means and including voltage detecting means responsive to said output of said first control means to enable said second control means to disable both said first control means and said voltage detecting means whenever a predetermined voltage level is reached at said output of said first control means whereby the power dissipation in said first control means and said voltage detecting means is minimized.

2. A circuit comprising:
first and second input terminals for connection to a source of alternating potential;
first and second output means;
said second input terminal being coupled to said second output terminal;
a gated rectifier means operatively coupled between said first input and said first output terminals, and having a gate means associated therewith;
first switching means having an input operatively coupled to said first input terminal and having an output operatively coupled to said gate means for turning on said gated rectifier means to supply DC voltage to said output means;
second switching means including a switch and a voltage detecting means, with said switch being operatively coupled between said input of said first switching means and said second input terminal, said voltage detecting means being operatively coupled to said output of said first switching means so as to enable said second switching means to disable both said first switching means and said voltage detecting means when a predetermined voltage level is reached at said output of said first switching means whereby the power dissipation in said first switching means and said voltage detecting means is minimized.

3. The circuit as claimed in claim 2 in which said switch of said second switching means is a thyristor.

4. The circuit as claimed in claim 3 in which said thyristor is a silicon controlled rectifier, said gated rectifier means includes a silicon controlled rectifier, said first switching means includes a transistor, and said voltage detecting means includes a zener diode.

5. A rectification and regulation circuit comprising:
first and second input terminals for connection to a source of alternating potential;
first and second output terminals;
said second input terminal being connected to said second output terminal;
an electrical storage means coupled across said first and second output terminals;
a gated rectifier means operatively coupled between said first input and said first output terminals, and having a gate means associated therewith;
first switching means having an input operatively coupled to said first input terminal and having an output operatively coupled to said gate means for turning on said gated rectifier means to supply DC voltage to said electrical storage means;
second switching means including a first switch and a first voltage detecting means, with said first switch being operatively coupled between said input of said first switching means and said second input terminal, said first voltage detecting means being operatively coupled to said output of said first switching means so as to enable said second switching means to disable said first switching means and said first voltage detecting means when a predetermined voltage level is reached at said output of said first switching means so as to minimize the power dissipation in said first switching means said first voltage detecting means; and
third switching means including a second switch and a second voltage detecting means;
said second switch being operatively coupled between said first and second input terminals, and said second voltage detecting means being operatively coupled between said first and second output terminals so as to disable said gated rectifier means and thereby cut off the supply of DC voltage to said electrical storage means.

6. The circuit as claimed in claim 4 in which said first switch is a thyristor and said first and second voltage detecting means include first and second zener diodes, respectively, which are selected to have breakdown voltages which establish the minimum and maximum voltage levels respectively, at said first and second output terminals.

7. The circuit as claimed in claim 4 in which the energy storage means is a capacitor.

8. A rectification and regulation circuit comprising:
first and second input terminals for connection to a source of alternating potential;
first and second input terminals;
said second input and output terminals being electrically connected together;
a first thyristor means having an anode, cathode and gate with said anode and cathode being operatively coupled to said first input and first output terminals, respectively;
a semiconductor switching means comprising a semiconductor switch having first, second and third electrodes;
a second thyristor means having an anode, cathode and gate with said cathode thereof being coupled to said second input terminal and with said anode thereof being coupled to said first electrode and operatively coupled to said first input terminal;
a voltage determining circuit including a constant voltage means coupling said second electrode with said second output terminal and also being coupled to said gate of said second thyristor means to turn on said second thyristor means when the voltage at said second electrode reaches a predetermined level so as to minimize the power dissipation in said semiconductor switching means and said voltage determining circuit;
said second electrode also being operatively coupled to said gate of said first thyristor for turning on said first thyristor means for supplying DC voltage to said first and second output terminals, and said third electrode being operatively coupled to said first input terminal.

9. The circuit as claimed in claim 8 in which said first and second thyristor means include silicon controlled rectifiers and said constant voltage means is a zener diode which is selected to have a breakdown voltage which establishes the minimum voltage at said first and second output terminals.

10. A rectification and regulation circuit comprising:
first and second input terminals for connection to a source of alternating potential;
first and second output terminals;
said second input terminal being connected to said second output terminal;
a first thyristor means having anode, cathode and gate electrodes, with said anode electrode being operatively connected to said first input terminal and said cathode electrode being connected to said first output terminal;

a semiconductor switching means having first, second and third electrodes;

a first diode means series connected between said anode electrode and said third electrode and operatively connected to said first electrode;

a second diode means and a first zener diode means, series connected at a junction point with the remaining end of said second diode means being connected to said gate electrode of said first thyristor means and said junction point being connected to said second electrode; and a second thyristor means having anode, cathode and gate electrodes with said gate electrode thereof being connected to said remaining end or anode of said first zener diode means, and with said anode electrode of said second thyristor means being connected to said third electrode, and with said cathode electrode thereof being connected to said second input terminal.

11. The circuit as claimed in claim 10 in which said first and second thyristor means comprise first and second silicon controlled rectifiers, respectively, said semiconductor means comprises an NPN transistor, and said first output terminal is positive with respect to said second output terminal.

12. A rectification and regulation circuit comprising:
first and second input terminals for connection to a source of alternating potential;
first and second output terminals;
said second input terminal being connected to said second output terminal;
an energy storage means connected across said first and second output terminals;
a first thyristor means having anode, cathode and gate electrodes, with said anode electrode being operatively connected to said first input terminal and said cathode electrode being connected to said first output terminal;
a semiconductor switching means having first, second and third electrodes;
a first diode means series connected between said anode electrode and said third electrode and operatively connected to said first electrode;
a second diode means and a first zener diode means, series connected at a junction point with the remaining end of said second diode means being connected to said gate electrode of said first thyristor means and said junction point being connected to said second electrode;
a second thyristor means having anode, cathode and gate electrodes with said gate electrode thereof being connected to the remaining end or anode of said first zener diode means, and with said anode terminal of said second thyristor means being connected to said third electrode, and with said cathode electrode thereof being connected to said second input terminal;
a second zener diode means series connected between said first and second output terminals with the cathode thereof being connected to said first output terminal;
a third thyristor means having anode, cathode and gate electrodes, with said anode electrode being operatively connected to said first input terminal and with said cathode electrode thereof being connected to said second input terminal and with said gate electrode thereof being connected to the anode of said second zener diode means.

13. The circuit as claimed in claim 12 in which said first, second and third thyristor means comprise first, second and third silicon controlled rectifiers, respectively, said semiconductor means comprises an NPN transistor, and said first and second diode means are selected to have breakdown voltages which establish minimum and maximum voltage levels respectively at said first and second output terminals, with said first output terminal being positive with respect to said second output terminal.

14. The circuit as claimed in claim 10 in which the energy storage means is a capacitor.

15. A rectifying and regulating circuit comprising:
first and second input terminals for connection to a source of alternating potential;
first and second resistors series connected with a first junction point therebetween and with one end of said first resistor being connected to said first input terminal;
a first silicon controlled rectifier having anode, gate and cathode electrodes with said anode electrode thereof being connected to the remaining end of said second resistor and said cathode electrode being connected to said second input terminal;
first and second output terminals with said second output terminal being connected to said second input terminal;
a second silicon controlled rectifier having anode, gate and cathode electrodes with said anode electrode thereof being connected to said first junction point and said cathode electrode thereof being connected to said first output terminal;
a third resistor and a first diode having anode and cathode electrodes with said third resistor having one end connected to the anode electrode of said second silicon controlled rectifier and the remaining end thereof connected to the anode electrode of said first diode;
a third silicon controlled rectifier having anode, cathode and gate electrodes;
a fourth resistor having one end connected to the cathode electrode of said first diode forming a second junction point, and with the remaining end of said fourth resistor being connected to said anode electrode of said third silicon controlled rectifier and with said cathode electrode of said third silicon controlled rectifier being connected to said second input terminal;
a second diode having anode and cathode electrodes with said cathode electrode thereof being connected to said gate electrode of said second silicon controlled rectifier;
a first zener diode having anode and cathode electrodes with its cathode electrode being connected to said anode electrode of said second diode and with the anode electrode of said first zener diode being connected to said gate electrode of said third silicon controlled rectifier;
a transistor having base, collector and emitter electrodes with said base electrode thereof being connected to said anode electrode of said third silicon controlled rectifier, and with said collector electrode thereof being connected to said cathode electrode of said first diode, and with said emitter electrode being connected to said cathode electrode of said first zener diode;

a fifth resistor connected between said gate electrode of said second silicon controlled rectifier and said first output terminal;

a sixth resistor connected between said anode electrode of said first zener diode and said second input terminal;

a second zener diode having anode and cathode electrodes with said anode electrode thereof being connected to said gate electrode of said first silicon controlled rectifier, and said cathode electrode thereof being connected to said first DC output terminal;

a seventh resistor connected in series with said anode electrode of said second zener diode and said second output terminal; and a capacitor connected in series between said first and second output terminals.

16. The circuit as claimed in claim 14 in which said first zener diode has a breakdown voltage which is set for a minimum DC voltage and said second zener diode has a breakdown voltage which is set for a maximum DC voltage desired at said first and second output terminals.

* * * * *

UNITED STATES PATENT OFFICE
CERTIFICATE OF CORRECTION

Patent No. 4,118,768      Dated October 3, 1978

Inventor(s) Denney L. Wilson, Sr.

It is certified that error appears in the above-identified patent and that said Letters Patent are hereby corrected as shown below:

Column 8, line 1, after "means" should be --and--.

Signed and Sealed this

Twentieth Day of February 1979

[SEAL]

Attest:

RUTH C. MASON
Attesting Officer

DONALD W. BANNER
Commissioner of Patents and Trademarks